United States Patent
Grammel et al.

(10) Patent No.: US 11,606,390 B1
(45) Date of Patent: Mar. 14, 2023

(54) REROUTING NETWORK TRAFFIC BASED ON DETECTING OFFLINE CONNECTION

(71) Applicant: Juniper Networks, Inc., Sunnyvale, CA (US)

(72) Inventors: Gert Grammel, Ditzingen (DE); Ajay Kachrani, Nashua, NH (US); Hao Wang, Kanata (CA)

(73) Assignee: Juniper Networks, Inc., Sunnyvale, CA (US)

( * ) Notice: Subject to any disclaimer, the term of this patent is extended or adjusted under 35 U.S.C. 154(b) by 171 days.

(21) Appl. No.: 17/217,999

(22) Filed: Mar. 30, 2021

(51) Int. Cl.
| | |
|---|---|
| *H04L 29/06* | (2006.01) |
| *H04L 9/40* | (2022.01) |
| *H04L 45/28* | (2022.01) |
| *H04L 45/60* | (2022.01) |
| *H04L 45/00* | (2022.01) |

(52) U.S. Cl.
CPC .......... *H04L 63/166* (2013.01); *H04L 45/28* (2013.01); *H04L 45/566* (2013.01); *H04L 45/60* (2013.01); *H04L 63/0236* (2013.01); *H04L 63/0435* (2013.01); *H04L 63/20* (2013.01)

(58) Field of Classification Search
CPC ............... H04L 63/166; H04L 63/0236; H04L 63/0435; H04L 63/20; H04L 9/007; H04L 9/008

USPC .......................................................... 713/151
See application file for complete search history.

(56) References Cited

U.S. PATENT DOCUMENTS

| | | | |
|---|---|---|---|
| 11,425,147 B2 * | 8/2022 | Raj | H04L 63/0471 |
| 2017/0324566 A1 * | 11/2017 | Kawasaki | H04L 9/006 |
| 2022/0329628 A1 * | 10/2022 | Zayats | G06F 9/505 |

* cited by examiner

*Primary Examiner* — Longbit Chai
(74) *Attorney, Agent, or Firm* — Shumaker & Sieffert, P.A.

(57) ABSTRACT

In some examples, a system includes a router device and a first adapter device in communication with the router device. The first adapter device includes processing circuitry configured to: communicate with the router device, wherein the router device is incapable of communicating in accordance with the MACsec protocol. The processing circuitry is further configured to establish an encrypted connection in accordance with the MACsec protocol between the first adapter device and a remote device, determine that the encrypted connection is offline, and output a message to the router device that the encrypted connection is offline. The router device is configured to communicate with the remote device via a second adapter device configured to communicate in accordance with the MACsec protocol and bypass the first adapter device.

20 Claims, 4 Drawing Sheets

REROUTING NETWORK TRAFFIC BASED ON DETECTING OFFLINE CONNECTION

TECHNICAL FIELD

The disclosure relates to computer networks.

BACKGROUND

A computer network is a collection of interconnected computing devices that exchange data and share resources. In a packet-based network the computing devices communicate data by dividing the data into small blocks called packets. Certain device within the network, such as routers and switches, maintain routing and/or forwarding information that describe paths through the network. In this way, the packets may be individually transmitted across the network from a source device to a destination device. The destination device extracts the data from the packets and assembles the data into its original form. Dividing the data into packets allows the source device to resend only those individual packets that may be lost during transmission. In some cases, packets are routed between and among data centers.

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

SUMMARY

In general, the disclosure describes devices, systems, and techniques for controlling a flow of network traffic (e.g., packets) through one or more network devices. As described in more detail, the disclosure describes example techniques to seamlessly indicate that an encrypted communication link is offline to quickly reroute traffic from a router device to maintain secure communication. A router device may be limited in capability of establishing secure communication links. For instance, a router device may be incapable of establishing a communication link in accordance with the Media Access Control Security (MACsec) protocol. To ensure secure communication, an adapter device is coupled to the router device, and the adapter device forms a communication link in accordance with the MACsec protocol with a remote adapter device. The adapter device facilitates encrypted communication between the router device and the remote device by providing information to the router device that the adapter device obtains through communication in accordance with the MACsec protocol and by receiving information from the remote adapter device in accordance with the MACsec protocol and forming the information for transmitting to the router device.

In response to the encrypted communication link becoming offline, the adapter device may be configured to propagate information indicating that the encrypted communication link is offline to the router device. The router device may then reroute communication through another adapter device, and possibly another router in the data center, to transmit and receive from the remote device through an encrypted communication link that is encrypted in accordance with the MACsec protocol.

The encrypted connections may go offline for a number of reasons. For example, configurations, configuration issues, or coordinated attacks (e.g., man-in-the-middle attacks) may compromise an encrypted connection or cause an encrypted connection to go offline. When the adapter device determines that an encrypted connection is compromised or is offline, the adapter device may send a message to the one or more network devices connected to the adapter device indicating that the encrypted connection is no longer available. By sending the message, the adapter device may cause the one or more network device to reroute network traffic through other secure connections which are still online. It may be beneficial for the adapter device to send the message indicating that the encrypted connection is compromised or is offline, so that the one or more network devices can reroute packets more quickly than systems where an adapter device does not inform a network device that an encrypted connection is no longer available.

A system includes a router device and a first adapter device in communication with the router device. The first adapter device includes processing circuitry configured to communicate with the router device in accordance with a communication protocol that is different than the Media Access Control Security (MACsec) protocol, wherein the router device is incapable of communicating in accordance with the MACsec protocol. The processing circuitry is further configured to establish an encrypted connection in accordance with the MACsec protocol between the first adapter device and a remote device, wherein the processing circuitry is configured to receive information from the router device in accordance with the communication protocol and forward the information to the remote device in accordance with the MACsec protocol, and receive information from the remote device in accordance with the MACsec protocol and forward the information to the router device in accordance with the communication protocol. The processing circuitry is configured to determine that the encrypted connection is offline and output a message to the router device that the encrypted connection is offline, wherein the router device is configured to communicate with the remote device via a second adapter device configured to communicate in accordance with the MACsec protocol and bypass the first adapter device.

In some examples, a method includes communicating, by processing circuitry of a first adapter device, with a router device in accordance with a communication protocol that is different than the Media Access Control Security (MACsec) protocol, wherein the router device is incapable of communicating in accordance with the MACsec protocol; and establishing, by the processing circuitry, an encrypted connection in accordance with the MACsec protocol between the first adapter device and a remote device, wherein the processing circuitry is configured to receive information from the router device in accordance with the communication protocol and forward the information to the remote device in accordance with the MACsec protocol, and receive information from the remote device in accordance with the MACsec protocol and forward the information to the router device in accordance with the communication protocol. The method further includes determining, by the processing circuitry, that the encrypted connection is offline; outputting, by the processing circuitry, a message to the router device that the encrypted connection is offline; and communicating, by the router device, with the remote device via a second adapter device configured to communicate in accordance with the MACsec protocol and bypass the first adapter device.

In some examples, a non-transitory computer-readable medium includes instructions for causing one or more programmable processors of a router device and a first adapter device to: communicate with the router device in accordance with a communication protocol that is different than the Media Access Control Security (MACsec) protocol, wherein the router device is incapable of communicating in accordance with the MACsec protocol; establish an encrypted connection in accordance with the MACsec protocol between the first adapter device and a remote device, wherein the processing circuitry is configured to receive information from the router device in accordance with the communication protocol and forward the information to the remote device in accordance with the MACsec protocol, and receive information from the remote device in accordance with the MACsec protocol and forward the information to the router device in accordance with the communication protocol; determine that the encrypted connection is offline; output a message to the router device that the encrypted connection is offline; and communicate with the remote device via a second adapter device configured to communicate in accordance with the MACsec protocol and bypass the first adapter device.

The details of one or more embodiments of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
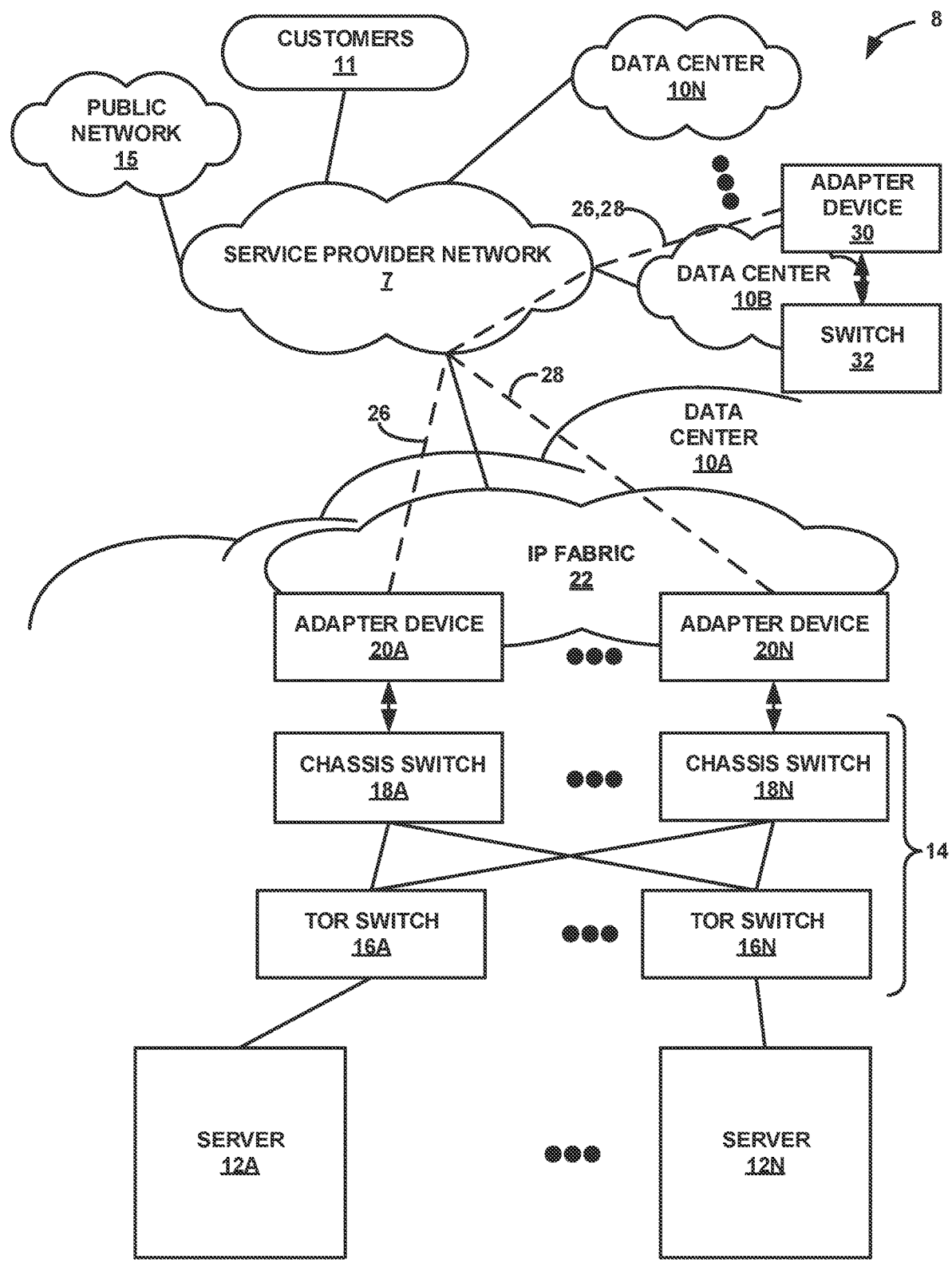
FIG. 1 is a block diagram illustrating an example computing infrastructure in which examples of the techniques described herein may be implemented.

FIG. 1 is a block diagram illustrating an example computing infrastructure 8 in which examples of the techniques described herein may be implemented. In general, data centers 10A-10N (collectively, "data centers 10") provide an operating environment for applications and services for customer sites 11 (illustrated as "customers 11") having one or more customer networks coupled to the data center by service provider network 7. Data centers 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within data centers 10. For example, data centers 10 may host multiple tenants (customers) each associated with one or more virtual private networks (VPNs), each of which may implement one of customer sites 11.

Service provider network 7 offers packet-based connectivity to attached customer sites 11, data centers 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10A may represent one of many geographically distributed network data centers. Data center 10A, like data centers 10B-10N, are configured to communicate with service provider network 7. As illustrated in the example of FIG. 1, data center 10A may be a facility that provides network services for customers. Although data center 10A alone can provide network services for customers 11, in some cases, data center 10A may provide network services in combination with any one or more of data centers 10B-10N. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or super-computing, and so on. Although illustrated as a separate edge network of service provider network 7, elements of data center 10A such as one or more physical network functions (PNFs) or virtualized network functions (VNFs) may be included within the service provider network 7 core.

In this example, data center 10A includes storage and/or compute servers interconnected via switch fabric 14 provided by one or more tiers of physical network switches and routers, with servers 12A-12N (herein, "servers 12") depicted as coupled to top-of-rack (TOR) switches 16A-16N. Servers 12 are computing devices and may also be referred to herein as "hosts" or "host devices." Although only server 12A coupled to TOR switch 16A is shown in detail in FIG. 1, data center 10A may include many additional servers coupled to other TOR switches 16 of the data center 10A.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18N (collectively, "chassis switches 18"). Although not shown, data center 10A may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10A may also include one or more physical network functions (PNFs) such as physical firewalls, load balancers, routers, route reflectors, broadband network gateways (BNGs), Evolved Packet Cores or other cellular network elements, and other PNFs.

In this example, TOR switches 16 and chassis switches 18 provide servers 12 with redundant (multi-homed) connectivity to IP fabric 22 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 22, which may perform layer 3 routing to route network traffic between data center 10A and customer sites 11 by service provider network 7. The switching architecture of data center 10A is merely an example. Other switching architectures may have more or fewer switching layers, for instance.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An in-tuple refers to any n items drawn from the 5-tuple. For example, a 2-tuple for a packet may refer to the combination of <source network address, destination network address> or <source network address, source port> for the packet.

Servers 12 may each represent a compute server, switch, or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Adapter devices 20A-20N (collectively, "adapter devices 20") may represent computing devices which establish encrypted links over service provider network 7 and/or public network 15. As seen in FIG. 1, adapter device 20A is connected to chassis switch 18A and adapter device 20N is connected to chassis switch 18N. In some examples, an adapter device may be connected to each chassis switch of chassis switches 18, but this is not required. In some examples, an adapter device may be connected to one or more of TOR switches 16. Adapter devices may be connected to any network device within a data center of data centers 10.

Adapter device 20A may be configured to exchange network traffic (e.g., packets) with chassis switch 18A. For example, an interface of chassis switch 18A may be physically connected to an interface of adapter device 20A. Chassis switch 18A may send information to adapter device 20A over the link, and adapter device 20A may send information to chassis switch 18 over the link. In some examples, Chassis switch 18A communicates with adapter device 20A according to a communication protocol other than MACsec (e.g., Bidirectional Forwarding Detection (BFD), LLDP, ITUT Y.1711). Network traffic which chassis switch 18A sends to adapter device 20A may not be encrypted or may be limited in its encryption. When adapter device 20A sends network traffic to another computing device outside of data center 10A, it may be beneficial for adapter device 20A to encrypt the network traffic, since the destination computing device is not located within the same data center, and the network traffic may be intercepted or otherwise compromised. In some examples, MACsec is capable of performing line-speed encryption. MACsec is Layer 2 based. By encrypting Layer 2 links, it may be easier for system 10 to load balance across aggregate ethernet (AE) as compared with systems that do not encrypt Layer 2 links.

In some examples, adapter device 20A encrypts network traffic according to the Media Access Control security (MACsec) protocol. In some examples, chassis switch 18A might not be capable of communicating in accordance with the MACsec protocol. In some examples, chassis switch 18A may communicate in accordance with a communication protocol that is different form the MACsec protocol.

The MACsec protocol provides point-to-point security over communication links. It may be beneficial to use the MACsec protocol when sending network traffic between two different geographic locations (e.g., from one data center to another data center), because MACsec is capable of exposing and preventing most security threats, including denial of service, intrusion attacks, man-in-the-middle attacks, masquerading attacks, passive wiretapping attacks, and playback attacks. MACsec secures a communication link for many kinds of network traffic, including traffic sent according to the Link Layer Discovery Protocol (LLDP), the Link Aggregation Control Protocol (LACP), the Dynamic Host Configuration Protocol (DHCP), the Address Resolution Protocol (ARP), for example.

Adapter device 20A may be configured to establish one or more secure connections between adapter device 20A and one or more other computing devices (e.g., remote devices). For example, adapter device 20A may establish a first encrypted connection 26 between adapter device 20A and a remote device, such as adapter device 30 within data center 10B. Adapter device 30 is "remote" in the sense that adapter device 30 is located in datacenter 10B and adapter device 20A is located in datacenter 10A. As seen in FIG. 1, adapter device 30 is connected to switch 32 within data center 20B. In this way, chassis switch 18A may send network traffic to switch 32 over the first encrypted connection 26. In some examples, data center 10B may be configured in a substantially similar way as data center 10A is configured. For example, data center 10A may include a switch fabric and one or more servers (not illustrated in FIG. 1). Switch 32 may be one of the switches in a switch fabric of data center 10B, but this is not required. Switch 32 may represent any network device configured to operate within data center 10B. In some examples, adapter device 32 may establish a secure connection with switch 32 without adapter device 30. In examples where switch 32 is capable of MACsec communication, a MACsec encrypted connection may exist between adapter device 20A and switch 32. Although adapter device 30 is included in the example of FIG. 1, adapter device 30 is not needed in every case.

Adapter device 20A may establish and maintain the first encrypted connection 26 with adapter device 30 in order to facilitate secure exchange of network traffic between adapter device 20A and adapter device 30. To establish the first encrypted connection 26, adapter device 20A and adapter device 30 obtain a pre-shared key. The pre-shared key may include a connectivity association name (CKN) and a connectivity association key (CAK). The CAK may, in some cases, secure control plane traffic. When both of adapter device 20A and adapter device 30 possess the same CKN and CAK, the first encrypted connection 26 is established according to the MACsec protocol. After adapter device 20A and adapter device 30 receive the pre-shared key, adapter device 20A enables a MACsec Key Agreement (MKA) protocol in order to maintain the first encrypted connection 26. Adapter device 20A generates a secure association key (SAK) responsible for securing data plane traffic (e.g., network traffic, or packets). In some examples, adapter device 20A generates the SAK by randomly generating a string of data bits. Adapter device 20A shares the SAK with adapter device 30. To maintain the first encrypted connection 26, adapter device 20A may periodically generate a new SAK and send the new SAK with adapter device 30. It may be beneficial to periodically generate a new SAK to protect against situations in which a third-party device obtains the SAK.

When adapter device 20A receives a packet from chassis switch 18A, adapter device may encrypt the packet using the SAK. Subsequently, adapter device 20A may send the packet to adapter device 30 over the secure connection 26. In some examples, adapter device 20A is configured to receive network traffic from chassis switch 18A in accordance with a communication protocol that is different from the MACsec protocol and forward the information to adapter device 30 in accordance with the MACsec protocol. In some examples, adapter device 20A may receive information from adapter device 30 in accordance with the MACsec protocol and forward the information to chassis switch 18A in accordance with the communication protocol that is different from the MACsec protocol.

Adapter device 30 may be configured to decrypt the packet using the SAK and send the decrypted packet to switch 32. Consequently, by generating the SAK and sending the SAK to adapter device 30, adapter device 20A may give adapter device 20 the necessary tool which allows adapter device 30 to receive network traffic over encrypted connection 26 and decrypt the network traffic so that the network traffic can be routed and processed within data center 10B. In some examples, adapter device 30 is configured to receive network traffic from the adapter device 20A in accordance with the MACsec protocol and forward the information to switch 32 in accordance with a communication protocol that is different from the MACsec protocol. In some examples, switch 32 might not be capable of communicating according to the MACsec protocol.

Additionally, or alternatively, adapter device 20A may add, according to the MACsec protocol, a packet header and/or a packet tail to each packet that adapter device 20A sends to adapter device 30 over the first encrypted connection 26. In one example, the packet header includes 8 bytes and the packet tail includes 16 bytes, but this is not required. The packet header and the packet tail may include any number of bytes. Adapter device 30 may process the packet header and the packet tail of each packet arriving over the encrypted connection 26 in order to determine whether any irregularities are present. Such irregularities may indicate that the network traffic has been intercepted or otherwise compromised by a third party. When adapter device 30 detects irregularities in the packet header and/or the packet tail, adapter device 30 may cancel (e.g., disconnect) the first encrypted connection 26.

The first encrypted connection 26 may go offline for a number of reasons. For example, issues with the network (e.g., service provider network 7), issues with the configuration of one or more network devices, or detected attacks may cause one or both of adapter device 20A and adapter device 30 to bring first encrypted connection 26 offline. As discussed above, adapter device 30 may cancel the first encrypted connection 26 in response to detecting irregularities in network traffic arriving over first encrypted connection 26. In some examples, first encrypted connection 26 may go offline when one or more encryption keys (e.g., the SAK key) expire. In any case, when adapter device 20A determines that the first encrypted connection 26 is offline, adapter device 20A may output a message to chassis switch 18A that the first encrypted connection 26 is offline.

In response to the message that first encrypted connection 26 is offline, chassis switch 18A may cease sending packets to adapter device 20A for forwarding over the first encrypted connection 26 when connection is offline. In this way, rather than chassis switch 18A outputting network traffic to adapter device 20A, and adapter device 20A failing to forward the network traffic (e.g., chassis switch 18A outputting to a "black hole"), chassis switch 18A seamlessly reroutes network traffic via another encrypted connection. Adapter device 20A sending the message to chassis switch 18A that the first encrypted connection 26 is offline may help to execute fault propagation. Fault propagation allows host switches (e.g., chassis switches 18) to provide fast failure switchover. In some cases, MACsec faults stem from misconfiguration (non-matching keys), key exchange protocol issues, and extended recovery times after failure. In any case, MACsec failures may be propagated back to the host switch (e.g., chassis switch 18A) as a link failure (LF), causing the host switch to protect traffic flowing across the encrypted connection 26.

Chassis switch 18A may reroute network traffic to another switch in response to receiving a message from adapter device 20A that the first encrypted connection 26 is offline. For example, chassis switch may reroute network traffic to another switch within switch fabric 14 (e.g., chassis switch 18N). As seen in FIG. 1, chassis switch 18N is connected to adapter device 20N. Adapter device 20N may, in some cases, be substantially the same as adapter device 20A except that adapter device 20N is connected to chassis switch 18N, whereas adapter device 20A is connected to chassis switch 18A. By causing chassis switch 18A to reroute network traffic to chassis switch 18N, adapter device 20A may cause the network traffic to eventually reach adapter device 30 via another encrypted connection. For example, adapter device 20N may establish and maintain a second encrypted connection 28 with adapter device 30 in order to facilitate a secure exchange of network traffic between adapter device 20N and adapter device 30.

In some examples, adapter device 20N may establish the second encrypted connection 28 according to the MACsec protocol. To establish the second encrypted connection 28, adapter device 20N and adapter device 30 may obtain a pre-shared key. The pre-shared key may include a CKN and a CAK. After adapter device 20N and adapter device 30 receive the pre-shared key, adapter device 20N enables the MKA protocol in order to maintain the second encrypted connection 28. Adapter device 20N generates an SAK. In some examples, adapter device 20N generates the SAK by randomly generating a string of data bits. Adapter device 20N shares the SAK with adapter device 30. To maintain the second encrypted connection 28, adapter device 20N may periodically generate a new SAK and send the new SAK with adapter device 30. It may be beneficial to periodically generate a new SAK to protect against situations in which a third-party device obtains the SAK. Moreover, it may be beneficial for adapter device 20N to establish the second encrypted connection 28 in addition to adapter device 20A establishing the first encrypted connection 26 so that in a case where the first encrypted connection 26 goes offline, packets can still arrive at adapter device 30 via the second encrypted connection 28.

When chassis switch 18A reroutes packets to adapter device 20N in response to receiving a message that first encrypted connection 26 is offline, adapter device 20N may encrypt the packets according to the MACsec protocol and send the packets to adapter device 30 via the second encrypted connection 28. For example, when adapter device 20N receives a packet from chassis switch 18N, adapter device may encrypt the packet using the SAK specific to the second encrypted connection 28. Subsequently, adapter device 20N may send the packet to adapter device 30 over the second encrypted connection 28. Adapter device 30 may be configured to decrypt the packet using the SAK specific to the second encrypted connection 28 and send the decrypted packet to switch 32. The SAK specific to the second encrypted connection 28 is different than the SAK specific to the first encrypted connection 26. For at least this reason, it may be secure to send packets over the second encrypted connection 28 even when the first encrypted connection 26 is compromised.

Adapter device 20A may improve an efficiency of data center 10A by sending a message to chassis switch 18A that the first encrypted connection 26 is offline, as compared with systems where adapter devices do not notify switches that an encrypted connection is down. For example, by sending the message to chassis switch 18A that the first encrypted connection 26 is offline, adapter device 20A prevents chassis switch 18A from continuing to attempt to route network traffic over a connection that is offline, and causes chassis switch 18A to reroute traffic over another encrypted connection which is online. In this way, by sending the message to chassis switch 18A that the first encrypted connection 26 is offline, adapter device 20A decreases an amount of time that it takes adapter device 30 to receive packets as compared with systems where the adapter device does not inform a switch that an encrypted connection is offline.

Adapter device 20A may reestablish the first encrypted connection 26 after the first encrypted connection 26 goes offline. The adapter device 20A may reestablish the first encrypted connection 26 according to the MACsec protocol, creating new encryption keys and exchanging the new encryption keys with adapter device 30. When adapter device 20A reestablishes the first encrypted connection 26, adapter device 20A may send a message to chassis switch 18A that the first encrypted connection 26 is back online, causing chassis switch 18A to cease rerouting network traffic via the second encrypted connection 28 and resume routing network traffic over the first encrypted connection 26.

Figure 2:
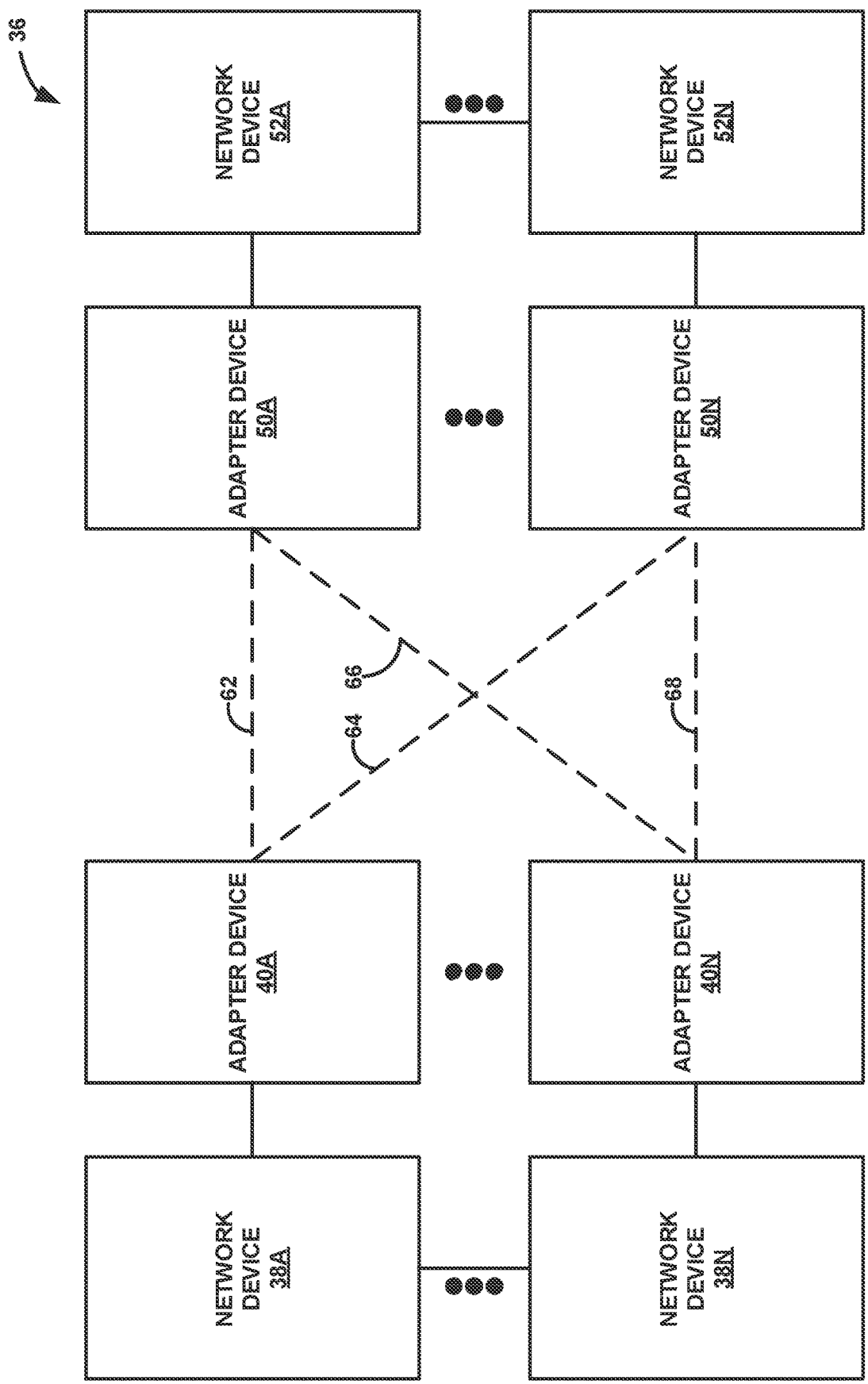
FIG. 2 is a block diagram illustrating a system including one or more encrypted connections, in accordance with one or more techniques of this disclosure.

FIG. 2 is a block diagram illustrating a system 36 including one or more encrypted connections, in accordance with one or more techniques of this disclosure. For example, system 36 includes a first set of network devices 38A-38N (collectively, "network devices 38"), a first set of adapter devices 40A-40N (collectively, "adapter devices 40"), a second set of adapter devices 50A-50N (collectively, "adapter devices 50"), and a second set of network devices 52A-52N (collectively, "network devices 52"). Network devices 38 may be an example of chassis switches 18 of FIG. 1, but this is not required. Network devices 38 may represent any set of network devices located within a data center. Adapter devices 40 may be examples of adapter devices 20 of FIG. 1. Adapter devices 50 may represent a set of devices which are located separately from adapter devices 40. That is, adapter devices 40 are at a first location, adapter devices 50 are at a second location different from the first location. In some examples, adapter devices 40 and adapter devices 50 are located in different data centers.

As seen in FIG. 2, adapter device 40A is connected to network device 38A and adapter device 40N is connected to network device 38N. In some examples, an adapter device of adapter devices 40 is connected to each network device of network devices 38. For example, if network devices 38 include ten network devices, adapter devices 40 may include ten network devices, where each network device of network devices 38 is connected to a respective adapter device of adapter devices 40. Network device 38A is connected to network device 38N. Additionally or alternatively, network device 38A may be connected to one or more other network devices of network devices 38. In this way, Network devices 38A may forward network traffic to network device 38A and/or one or more other network devices.

In some examples, adapter device 40A may establish an encrypted connection 62 with adapter device 50A. Adapter device 40A may establish the encrypted connection 62 according to the MACsec protocol, allowing adapter device 40A to encrypt data packets using an encryption key associated with encrypted connection 62, and send the encrypted data packets to adapter device 50A. Adapter device 50A may receive the encrypted data packets and decrypt the packets using the encryption key associated with encrypted connection 62. Additionally, adapter device 40A may establish an encrypted connection 64 with adapter device 50N. Adapter device 40A may establish the encrypted connection 64 according to the MACsec protocol, allowing adapter device 40A to encrypt data packets using an encryption key associated with encrypted connection 64, and send the encrypted data packets to adapter device 50N. Adapter device 50N may receive the encrypted data packets and decrypt the packets using the encryption key associated with encrypted connection 64.

Additionally, as seen in FIG. 2, adapter device 40N may establish an encrypted connection 66 with adapter device 50A. Adapter device 40N may establish the encrypted connection 66 according to the MACsec protocol, allowing adapter device 40N to encrypt data packets using an encryption key associated with encrypted connection 66, and send the encrypted data packets to adapter device 50A. Adapter device 50A may receive the encrypted data packets and decrypt the packets using the encryption key associated with encrypted connection 66. Adapter device 40N may establish an encrypted connection 68 with adapter device 50N. Adapter device 40N may establish the encrypted connection 68 according to the MACsec protocol, allowing adapter device 40N to encrypt data packets using an encryption key associated with encrypted connection 68, and send the encrypted data packets to adapter device 50N. Adapter device 50N may receive the encrypted data packets and decrypt the packets using the encryption key associated with encrypted connection 68.

Although FIG. 2 illustrates four adapter devices 40A, 40N, 50A, 50N, adapter devices 40 and adapter devices 50 may include one or more adapter devices not illustrated in FIG. 2. These adapter devices may represent endpoints of one or more encrypted connections. For example, adapter device 40A may establish an encrypted connection with one or more adapter devices 50 that are not illustrated in FIG. 2.

Encrypted connections 62, 64, 66, 68 may facilitate a secure flow of network traffic between network devices 38 and network devices 52. Since network devices 38 and adapter devices 40 may be located separately from adapter devices 50 and network devices 52, it may be beneficial to encrypt connections 62, 64, 66, 68 which span the geographical distance between adapter devices 40 and adapter devices 50, in order to protect data travelling across a geographic distance. For example, network device 38A may send network traffic (e.g., packets) to adapter device 40A. In some cases, network device 38A might not be capable of communicating according to the MACsec protocol. In some examples, chassis switch 38A may communicate in accordance with a communication protocol that is different form the MACsec protocol. Adapter device 40A may encrypt one or more packets according to the MACsec protocol using an encryption key associated with encrypted connection 62 and send the one or more packets to adapter device 50A via encrypted connection 62. Adapter device 40A may encrypt one or more packets using an encryption key associated with encrypted connection 64 and send the one or more packets to adapter device 50N via encrypted connection 62.

In some examples, adapter device 40A is configured to receive network traffic from network device 38A in accordance with a communication protocol that is different from the MACsec protocol and forward the information to adapter device 50A in accordance with the MACsec protocol. In some examples, adapter device 40A may receive information from adapter device 50A in accordance with the MACsec protocol and forward the information to network device 38A in accordance with the communication protocol that is different from the MACsec protocol.

Additionally, or alternatively, adapter device 40N may encrypt one or more packets using an encryption key associated with encrypted connection 66 and send the one or more packets to adapter device 50A via encrypted connection 66. Adapter device 40N may encrypt one or more packets using an encryption key associated with encrypted connection 68 and send the one or more packets to adapter device 50N via encrypted connection 68. Once packets arrive at adapter devices 50, the adapter devices may decrypt the packets and send the packets to respective network devices of network devices 52.

In some examples, adapter device 40A may determine that encrypted connection 62 is offline. Encrypted connection 62 may go offline for a number of reasons including a network issue or a configuration issue. Adapter device 40A and/or adapter device 50A may terminate encrypted connection 62 in response to detecting one or more irregularities. In any case, adapter device 40A may send a message to network device 38A, indicating that encrypted connection 62 is offline. By sending the message to network device 38A that encrypted connection 62 is offline, network device 38A may cease to send packets to adapter device 40A for forwarding to network device 52A via encrypted connection 62 and adapter device 50A. It may be beneficial for network device 38A to send one or more packets to network device 52A through other pathways while encrypted connection 62 is offline.

In some examples, network device 38A may reroute a set of packets to adapter device 40N via network device 38N based on receiving the message that encrypted connection 62 is offline, where a destination of the set of packets is network device 52A. Encrypted connections 66, 68 may be online while encrypted connection 62 is offline. In some examples, adapter device 40N may send one or more of the set of packets to adapter device 50A via encrypted connection 66, and adapter device 50A may decrypt the packets and send the packets to network device 52A. In some examples, adapter device 40N may send one or more of the set of packets to adapter device 50N via encrypted connection 68, and adapter device 50N may decrypt the packets and send the packets to network device 52A via network device 52N. In some examples, adapter device 40N may send one or more of the set of packets to adapter device 50N via an encrypted connection not illustrated in FIG. 2 that connects to an adapter device of adapter devices 50 not illustrated in FIG. 2. The adapter device may decrypt the packets and send the packets to network device 52A via one or more network devices connected to network device 52N. It may be beneficial for network device 38A to reroute the set of packets via other encrypted connections while encrypted connection 62 is offline, so that network device 52A continues to receive data while encrypted connection 62 is offline.

Adapter device 40A may reestablish encrypted connection 62 after encrypted connection 62 goes offline. To reestablish the encrypted connection 62, adapter device 40A may generate one or more new encryption keys and/or exchange one or more new encryption keys with adapter device 50A. Once adapter device 40A and adapter device 50A possess the encryption keys to open a secure connection, the encrypted connection 62 is reestablished. Adapter device 40A may send a message to network device 38A that encrypted connection 62 is reestablished, causing network device 38A resume sending network traffic to adapter device 40A for forwarding to network device 52A via encrypted connection 62.

In some examples, network device 38N may send network traffic to adapter device 40N for forwarding to network device 52N via encrypted connection 68. Adapter device 40N may determine that encrypted connection 68 is offline. Encrypted connection 68 may go offline for a number of reasons including a network issue or a configuration issue. Adapter device 40N and/or adapter device 50N may terminate encrypted connection 68 in response to detecting one or more irregularities. In any case, adapter device 40N may send a message to network device 38N, indicating that encrypted connection 68 is offline. By sending the message to network device 38N that encrypted connection 68 is offline, network device 38N may cease to send packets to adapter device 40N for forwarding to network device 52N via encrypted connection 68 and adapter device 50N. It may be beneficial for network device 38N to send one or more packets to network device 52N through other pathways while encrypted connection 62 is offline.

In some examples, network device 38A may reroute a set of packets to adapter device 40A via network device 38N based on receiving the message that encrypted connection 68 is offline, where a destination of the set of packets is network device 52N. Encrypted connections 62, 64 may be online while encrypted connection 68 is offline. In some examples, adapter device 40A may send one or more of the set of packets to adapter device 50N via encrypted connection 64, and adapter device 50N may decrypt the packets and send the packets to network device 52N. In some examples, adapter device 40A may send one or more of the set of packets to adapter device 50A via encrypted connection 62, and adapter device 50A may decrypt the packets and send the packets to network device 52N via network device 52A. In some examples, adapter device 40A may send one or more of the set of packets to adapter device 50N via an encrypted connection not illustrated in FIG. 2 that connects to an adapter device of adapter devices 50 not illustrated in FIG. 2. The adapter device may decrypt the packets and send the packets to network device 52N via one or more network devices connected to network device 52N.

Adapter device 40N may reestablish encrypted connection 68 after encrypted connection 68 goes offline. To reestablish the encrypted connection 68, adapter device 40N may generate one or more new encryption keys and/or exchange one or more new encryption keys with adapter device 50N. Once adapter device 40N and adapter device 50N possess the encryption keys to open a secure connection, the encrypted connection 68 is reestablished. Adapter device 40N may send a message to network device 38N that encrypted connection 68 is reestablished, causing network device 38N resume sending network traffic to adapter device 40N for forwarding to network device 52N via encrypted connection 68.

Figure 3:
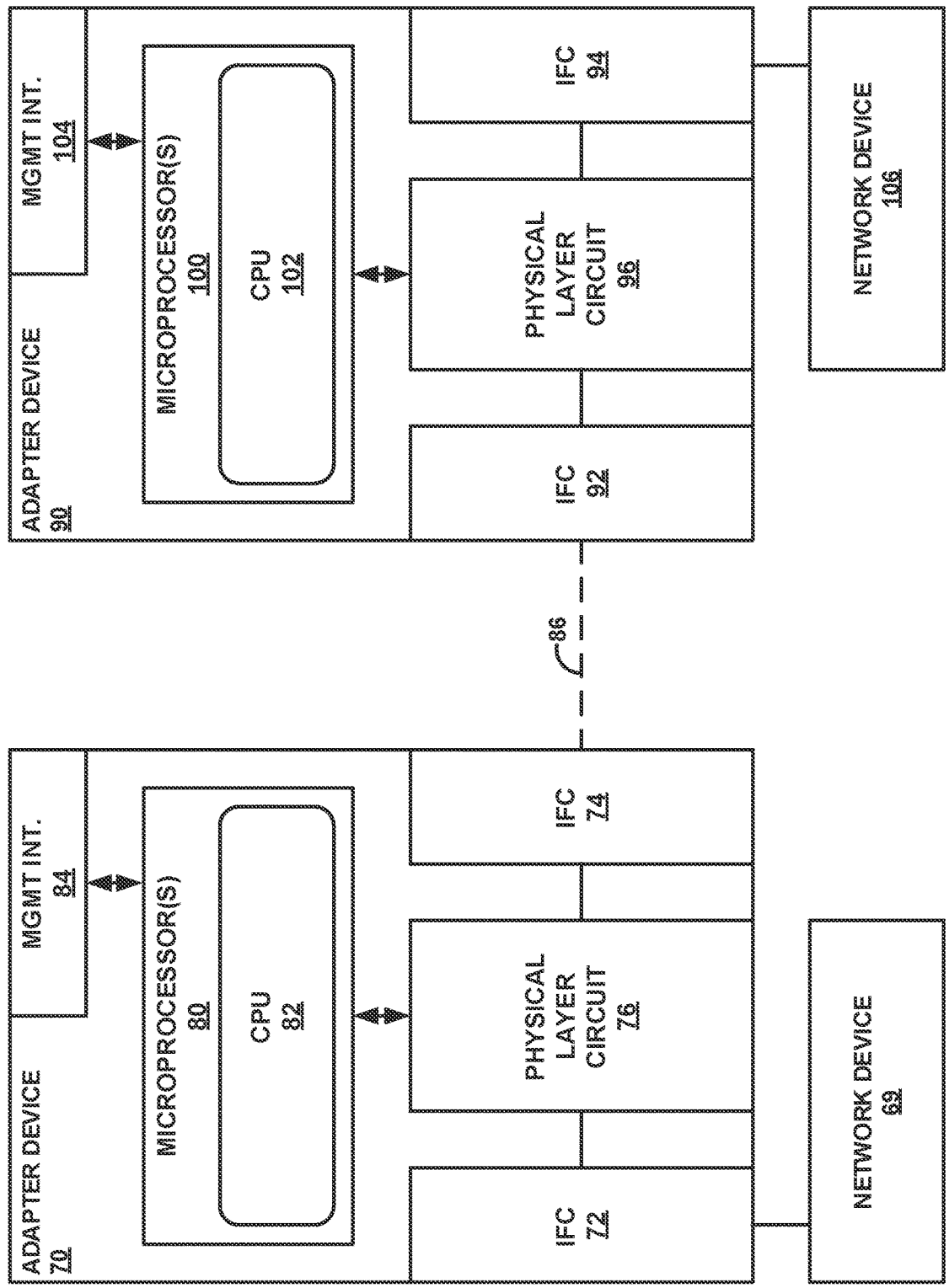
FIG. 3 is a block diagram illustrating a first example adapter device and a second example adapter device, in accordance with one or more techniques of this disclosure.

FIG. 3 is a block diagram illustrating an example adapter device 70 and an example adapter device 90, in accordance with one or more techniques of this disclosure. While adapter device 70 may be any adapter device configured to perform the techniques described herein, adapter device 70 may be an example of any of adapter devices 40 of FIG. 2. Additionally, while adapter device 70 may be any adapter device configured to perform the techniques described herein, adapter device 90 may be an example of any of adapter devices 50 of FIG. 2. As seen in FIG. 3, Adapter device 70 includes interface card (IFC) 72, physical layer circuit 76, IFC 78, microprocessor(s) 80, and management interface 84.

Microprocessor(s) 80 include CPU 82. Adapter device 90 includes IFC 92, physical layer circuit 96, IFC 94, microprocessor(s) 100, and management interface 104. Microprocessor(s) 100 include CPU 102. As seen in FIG. 3, network device 69 is connected to IFC 72 of adapter device 70, IFC 74 of adapter device 70 is connected to IFC 92 of adapter device 90, and IFC 94 of adapter device 90 is connected to network device 106.

Adapter device 70 may receive network traffic (e.g., packets) from network device 69 via IFC 72. In some cases, Network device 69 might not be capable of communicating according to the MACsec protocol. In some examples, network device 69 may communicate in accordance with a communication protocol that is different form the MACsec protocol. Physical layer circuit 76 may, in some cases, encrypt packets received via IFC 72. Physical layer circuit 76 may encrypt packets according to the MACsec protocol by applying an encryption key (e.g., an SAK) associated with encrypted connection 86. Adapter device 90 may possess an encryption key associated with encrypted connection 86 which allows adapter device 90 to decrypt network traffic which adapter device 70 sends to adapter device 90 via encrypted connection 86. When physical layer circuit 76 encrypts network traffic using the encryption key associated with encrypted connection 86, adapter device 70 forwards the encrypted network traffic to adapter device 90 via encrypted connection 86.

In some examples, adapter device 70 is configured to receive network traffic from network device 69 in accordance with a communication protocol that is different from the MACsec protocol and forward the information to adapter device 90 in accordance with the MACsec protocol. In some examples, adapter device 70 may receive information from adapter device 90 in accordance with the MACsec protocol and forward the information to network device 69 in accordance with the communication protocol that is different from the MACsec protocol.

Physical layer circuit 76 may include, for example, microprocessors, digital signal processors (DSPs), application specific integrated circuits (ASICs), field programmable gate array (FPGAs), or equivalent discrete or integrated logic circuitry, or a combination of any of the foregoing devices or circuitry. Physical layer circuit 76 may represent an integrated circuit which is configured to execute one or more encryption protocols, such as MACsec. That is, physical layer circuit 76 may process each packet arriving at adapter device 70 according to the MACsec protocol, encrypting data in the packet payload. Moreover, physical layer circuit 76 may add information to each packet according to the MACsec protocol. For example, physical layer circuit 76 may add a header and a tail to each frame which traverses encrypted connection 86. Adapter device 90 may compare the header and/or the frame with expected headers and frames to determine whether any irregularities are present. When adapter device 90 detects irregularities in data packets or frames arriving over encrypted connection 86, adapter device 90 may terminate the encrypted connection 86.

Adapter device 70 may establish and maintain the encrypted connection 86 with adapter device 90 in order to facilitate secure exchange of network traffic between adapter device 70 and adapter device 90. To establish the encrypted connection 86, adapter device 70 and adapter device 90 may receive a pre-shared key. The pre-shared key may include a CKN and a CAK. The CKN may represent a "name" of the encrypted connection 86. In some examples, adapter device 70 may generate the pre-shared key including the CAK and the CKN. In some examples, adapter device 70 may receive the pre-shared from another device (e.g., a server). The CAK may, in some cases, secure control plane traffic. When both of adapter device 20A and adapter device 30 possess the CKN and CAK, the first encrypted connection 26 is established according to the MACsec protocol.

After the encrypted connection 86 is established, adapter device 70 may enable a MACsec Key Agreement (MKA) protocol in order to maintain the first encrypted connection 26. For example, Microprocessor(s) 80 may execute the MKA protocol using CPU 82. CPU 82 generates a secure association key (SAK) responsible for securing data (e.g., packets frames). In some examples, adapter device 70 generates the SAK by randomly generating a string of data bits. Adapter device 70 shares the SAK with adapter device 90. To maintain the encrypted connection 86, CPU 82 may periodically generate a new SAK and send the new SAK to adapter device 90. It may be beneficial to periodically generate a new SAK to protect against situations in which a third-party device obtains the SAK. Microprocessor(s) may send one or more packets to physical layer circuit 76 indicating when CPU 82 generates a new SAK. Physical layer circuit 76 may apply the new SAK when encrypting data for sending over encrypted connection 86.

In some examples, The key exchange protocol (e.g., IEEE 802.1X) for MACsec can be hosted on adapter device 70 itself and does not require additional software to be configured on network device 69. In this way, the adapter device 70 can operate independently from manner from network device 69.

In some examples, adapter device 70 may determine that encrypted connection 86 is offline. Adapter device 70 may determine that encrypted connection 86 is offline by receiving a message from adapter device 90 indicating that there are one or more irregularities in the headers and tails which physical layer circuit 76 adds to the packets. In some examples, encrypted connection 86 goes offline due to network issues or configuration issues. In any case, when encrypted connection 86 goes offline, Adapter device 70 may output a message to network device 69 that encrypted connection 86 is offline, causing network device 69 to reroute packets to network device 106 via one or more other encrypted connections. Adapter device 70 may reestablish the encrypted connection 86 by exchanging an encryption key with adapter device 90. Subsequently, adapter device 70 may output a message to network device 69 that the encrypted connection 86 is online, causing network device 69 to sent network traffic to adapter device 70 for sending over the encrypted connection 86.

Adapter device 90 may be substantially the same as adapter device 70. Physical layer circuit 96 may include, for example, microprocessors, DSPs, ASICs, FPGAs, or equivalent discrete or integrated logic circuitry, or a combination of any of the foregoing devices or circuitry. Physical layer circuit 96 may decrypt packets received from adapter device 70 using an encryption key associated with encrypted connection 86. In some examples, the physical layer circuit 96 decrypts packets using the same encryption key which physical layer circuit 76 uses to encrypt packets. CPU 102 may execute an MKA protocol in order to maintain the encrypted connection 86. That is, when the encryption key is updated, CPU 102 may send one or more MKA packets to physical layer circuit 96 indicating that the encryption key is updated.

Figure 4:
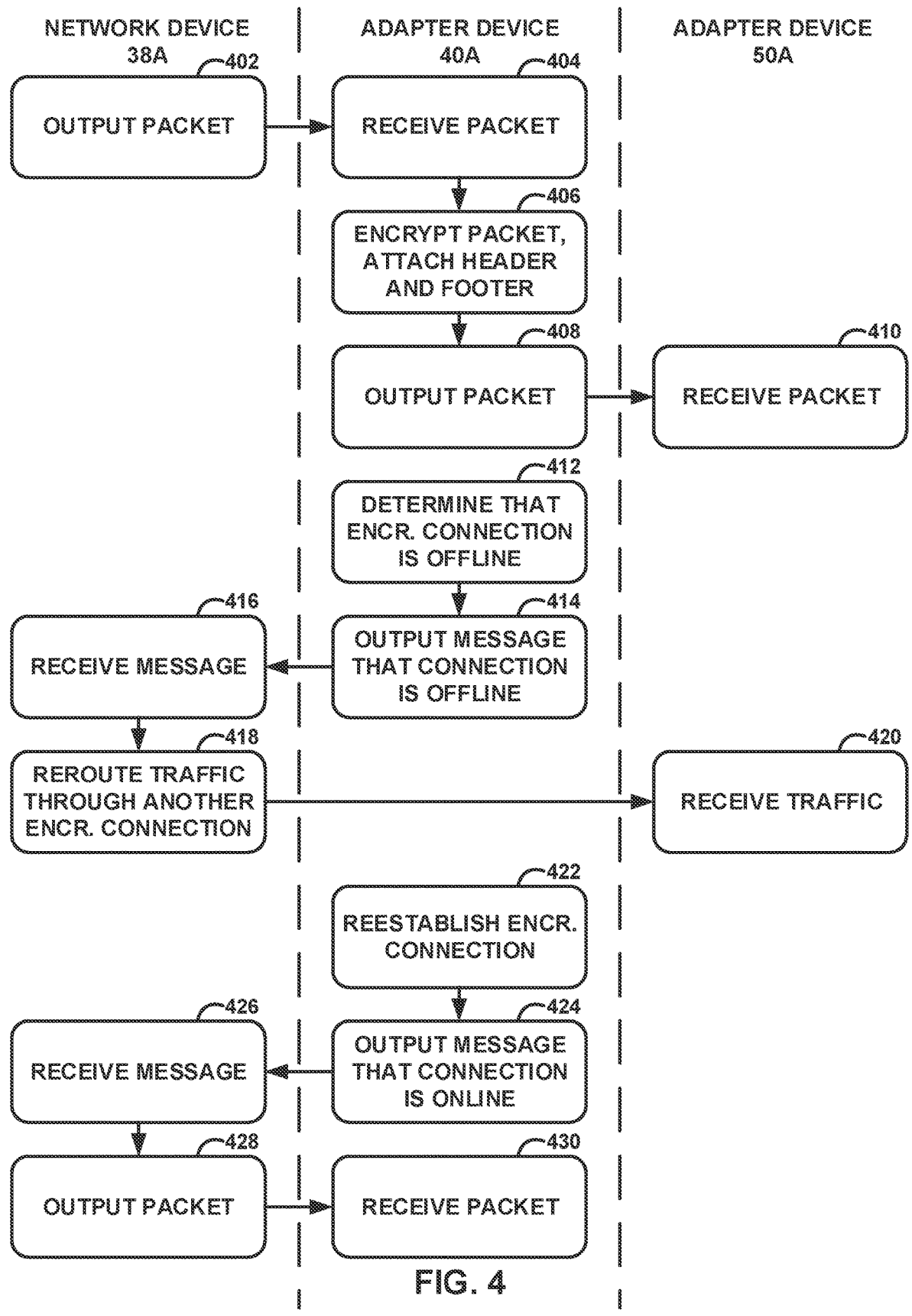
FIG. 4 is a flow diagram illustrating an example operation for rerouting packets when an encrypted connection goes offline, in accordance with one or more techniques of this disclosure.

FIG. 4 is a flow diagram illustrating an example operation for rerouting packets when an encrypted connection goes offline, in accordance with one or more techniques of this disclosure. FIG. 4 is described with respect to system 36 of FIG. 2. However, the techniques of FIG. 4 may be performed by different components of system 36 or by additional or alternative devices.

Network device 38A may output a packet to adapter device 40A (402). Adapter device receives the packet (404). In response to receiving the packet, adapter device 40A may encrypt the packet and attach a packet header and/or a packet tail to the packet (406). In some examples, adapter device 40A encrypts the packet according to the MACsec protocol. The adapter device 40A may use an encryption key, e.g., an SAK, to encrypt a payload of the packet. Moreover, adapter device 40A may add a header and tail to the packet according to the MACsec protocol. Adapter device 40A may output the encrypted packet to adapter device 50A via an encrypted connection (408). Adapter device 50A may receive the packet (410). In some examples, adapter device 50A may decrypt the packet using an encryption key and output the packet to a network device. Adapter device 50A may, in some cases, use the same encryption key to decrypt the packet as adapter device 40A uses to encrypt the packet.

Adapter device 40A may determine that the encrypted connection between adapter device 40A and adapter device 50A is offline (412). In some examples, adapter device 40A may determine that the encrypted connection is offline based on receiving a message from adapter device 50A indicating one or more irregularities in the packet header or the packet tail added by adapter device 40A. In some examples, adapter device 40A may determine that the encrypted connection is offline based on detecting one or more issues with the connection. In any case, adapter device 40A may output a message that the encrypted connection is offline (414) to network device 38A. Network device 38A may receive the message (416). In response to receiving the message that the encrypted connection is offline, network device 38A may reroute network traffic through another encrypted connection (418). For example, network device 38A may reroute the traffic to another adapter device in the same data center as adapter device 40A and network device 38A. The other adapter device may maintain an encrypted connection with adapter device 40A. Consequently, network device 38A may reroute the network traffic to adapter device 50A even though the encrypted connection between adapter device 40A and adapter device 50A is offline. Adapter device 50A may receive the traffic (420) and decrypt the traffic.

In some examples, adapter device 40A may reestablish the encrypted connection between adapter device 40A and adapter device 50A (422). Adapter device 40A may output a message that the encrypted connection is back online (424), and network device 38A may receive the message (426). When network device 38A receives the message that the encrypted connection is back online, network device 38A may output a packet to adapter device 40A for forwarding to adapter device 50A over the encrypted connection (428). Adapter device 40A may receive the packet (430).

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A system comprising:
a router device; and
a first adapter device in communication with the router device, the first adapter device comprising processing circuitry configured to:
communicate with the router device in accordance with a communication protocol that is different than the Media Access Control Security (MACsec) protocol, wherein the router device is incapable of communicating in accordance with the MACsec protocol;
establish an encrypted connection in accordance with the MACsec protocol between the first adapter device and a remote device, wherein the processing circuitry is configured to receive information from the router device in accordance with the communication protocol and forward the information to the remote device in accordance with the MACsec protocol, and receive information from the remote device in accordance with the MACsec protocol and forward the information to the router device in accordance with the communication protocol;
determine that the encrypted connection is offline; and
output a message to the router device that the encrypted connection is offline,
wherein the router device is configured to communicate with the remote device via a second adapter device configured to communicate in accordance with the MACsec protocol and bypass the first adapter device.

2. The system of claim 1,
wherein the router device is configured to output network traffic including a plurality of packets to the first adapter device, and
wherein the processing circuitry is configured to:
receive, from the router device, the network traffic;
encrypt, using an encryption key stored in a database of the first adapter device, the network traffic; and
send the encrypted network traffic to the remote device via the encrypted connection.

3. The system of claim 2, wherein the router device is a first router device, wherein the encrypted connection is a first encrypted connection, wherein a second encrypted connection in accordance with the MACsec protocol exists between the second adapter device and the remote device, and wherein to communicate with the remote device via a second adapter device, the router device is configured to:
reroute the network traffic to the second adapter device via a second router device, causing the second router device to send the network traffic to the remote device via the second encrypted connection, wherein the second adapter device is configured to communicate with the second router device in accordance with a communication protocol that is different than the Media Access Control Security (MACsec) protocol.

4. The system of claim 3, wherein the first router device, the first adapter device, the second router device, and the second adapter device are located in a data center, and wherein the remote device is located separately from the data center.

5. The system of claim 2, wherein outputting the message to the router device that the encrypted connection is offline causes the router device to cease outputting the network traffic to the first adapter device.

6. The system of claim 2, wherein the processing circuitry is further configured to attach a packet header to each packet of the network traffic sent over the encrypted connection, allowing the remote device to process the packet header to determine if the network traffic is compromised.

7. The system of claim 2, wherein the remote device is a third adapter device, and wherein to establish the encrypted connection in accordance with the MACsec protocol, the processing circuitry is configured to:
generate the encryption key, wherein the encryption key represents a secure association key (SAK) according to the MACsec protocol; and
exchange the encryption key with the remote device.

8. The system of claim 2, wherein the processing circuitry is configured to:
receive, from the remote device, information indicating an update in an encryption key used by the remote device; and
update, based on receiving the information indicating the update in the encryption key used by the remote device, the encryption key used by the first adapter device to encrypt the network traffic.

9. The system of claim 8, wherein to update the encryption key, the processing circuitry is configured to:
receive one or more MACsec Key Authentication (MKA) packets; and
update the encryption key based on the one or more MKA packets.

10. The system of claim 1, wherein the processing circuitry is further configured to:
reestablish the encrypted connection after determining that the encrypted connection is offline; and
output a message to the router device that the encrypted connection is online;
send, by the router device, one or more packets to the adapter device; and
send, by the adapter device, the one or more packets to the remote device via the encrypted connection.

11. The method of claim 1, further comprising:
outputting, by the router device, network traffic including a plurality of packets to the first adapter device;
receiving, by the processing circuitry from the router device, the network traffic;
encrypting, by the processing circuitry using an encryption key stored in a database of the first adapter device, the network traffic; and
sending, by the processing circuitry, the encrypted network traffic to the remote device via the encrypted connection.

12. The method of claim 11, wherein the router device is a first router device, wherein the encrypted connection is a first encrypted connection, wherein a second encrypted connection in accordance with the MACsec protocol exists between the second adapter device and the remote device, and wherein communicating with the remote device via a second adapter device comprises:
rerouting, by the router device, the network traffic to the second adapter device via a second router device, causing the second router device to send the network traffic to the remote device via the second encrypted connection, wherein the second adapter device is configured to communicate with the second router device in accordance with a communication protocol that is different than the Media Access Control Security (MACsec) protocol.

13. The method of claim 11, wherein outputting the message to the router device that the encrypted connection is offline causes the router device to cease outputting the network traffic to the first adapter device.

14. The method of claim 11, wherein the method further comprises attaching a packet header to each packet of the network traffic sent over the encrypted connection, allowing the remote device to process the packet header to determine if the network traffic is compromised.

15. The method of claim 11, wherein the remote device is a third adapter device, and wherein establishing the encrypted connection in accordance with the MACsec protocol comprises:
generating the encryption key, wherein the encryption key represents a secure association key (SAK) according to the MACsec protocol; and
exchanging the encryption key with the remote device.

16. The method of claim 11, further comprises:
receiving, by the processing circuitry from the remote device, information indicating an update in an encryption key used by the remote device; and
updating, by the processing circuitry based on receiving the information indicating the update in the encryption key used by the remote device, the encryption key used by the first adapter device to encrypt the network traffic.

17. The method of claim 16, wherein to updating the encryption key comprises:
receiving, by the processing circuitry, one or more MACsec Key Authentication (MKA) packets; and
updating, by the processing circuitry, the encryption key based on the one or more MKA packets.

18. A method comprising:
communicating, by processing circuitry of a first adapter device, with a router device in accordance with a communication protocol that is different than the Media Access Control Security (MACsec) protocol, wherein the router device is incapable of communicating in accordance with the MACsec protocol;
establishing, by the processing circuitry, an encrypted connection in accordance with the MACsec protocol between the first adapter device and a remote device, wherein the processing circuitry is configured to receive information from the router device in accordance with the communication protocol and forward the information to the remote device in accordance with the MACsec protocol, and receive information from the remote device in accordance with the MACsec protocol and forward the information to the router device in accordance with the communication protocol;
determining, by the processing circuitry, that the encrypted connection is offline;
outputting, by the processing circuitry, a message to the router device that the encrypted connection is offline; and
communicating, by the router device, with the remote device via a second adapter device configured to communicate in accordance with the MACsec protocol and bypass the first adapter device.

19. The method of claim 18, further comprising:
reestablishing, by the processing circuitry, the encrypted connection after determining that the encrypted connection is offline; and
outputting, by the processing circuitry, a message to the router device that the encrypted connection is online;
sending, by the router device, one or more packets to the adapter device; and
sending, by the processing circuitry, the one or more packets to the remote device via the encrypted connection.

20. A non-transitory computer-readable medium comprising instructions for causing one or more programmable processors of a router device and a first adapter device to:
communicate with the router device in accordance with a communication protocol that is different than the Media Access Control Security (MACsec) protocol, wherein the router device is incapable of communicating in accordance with the MACsec protocol;
establish an encrypted connection in accordance with the MACsec protocol between the first adapter device and a remote device, wherein the processing circuitry is configured to receive information from the router device in accordance with the communication protocol and forward the information to the remote device in accordance with the MACsec protocol, and receive information from the remote device in accordance with the MACsec protocol and forward the information to the router device in accordance with the communication protocol;
determine that the encrypted connection is offline;
output a message to the router device that the encrypted connection is offline; and
communicate with the remote device via a second adapter device configured to communicate in accordance with the MACsec protocol and bypass the first adapter device.

* * * * *